US012683236B2

(12) United States Patent
Eidam et al.

(10) Patent No.: US 12,683,236 B2
(45) Date of Patent: Jul. 14, 2026

(54) RUPTURE DEVICE AND METHOD FOR PRODUCING A RUPTURE DEVICE

(71) Applicant: ElringKlinger AG, Dettingen (DE)

(72) Inventors: Kirk Eidam, Bad Camberg (DE); Björn Schulz, Selters (DE); Bernd Schäfer, Mengerskirchen (DE); Ingo Wachholz, Runkel (DE); Mathias Scherer, Sigmaringen (DE)

(73) Assignee: ElringKlinger AG, Dettingen (DE)

( * ) Notice: Subject to any disclaimer, the term of this patent is extended or adjusted under 35 U.S.C. 154(b) by 593 days.

(21) Appl. No.: 17/994,159

(22) Filed: Nov. 25, 2022

(65) Prior Publication Data

US 2023/0091675 A1 Mar. 23, 2023

Related U.S. Application Data

(63) Continuation of application No. PCT/EP2021/064852, filed on Jun. 2, 2021.

(30) Foreign Application Priority Data

Jun. 5, 2020 (DE) ..................... 10 2020 207 110.1

(51) Int. Cl.
*H01M 50/342* (2021.01)
*F16K 17/16* (2006.01)

(52) U.S. Cl.
CPC ......... *H01M 50/3425* (2021.01); *F16K 17/16* (2013.01); *H01M 2220/20* (2013.01)

(58) Field of Classification Search
CPC ........... H01M 50/3425; H01M 220/20; H01M 50/375; F16K 17/16
See application file for complete search history.

(56) References Cited

U.S. PATENT DOCUMENTS

| | | | | |
|---|---|---|---|---|
| 4,842,965 A | * | 6/1989 | Urushiwara | H01M 50/3425 220/203.08 |
| 6,440,599 B1 | | 8/2002 | Takada et al. | |
| 2005/0069760 A1 | | 3/2005 | Somatomo | |
| 2005/0181272 A1 | | 8/2005 | Kim | |
| 2005/0287422 A1 | * | 12/2005 | Kim | H01M 50/3425 429/185 |
| 2007/0009785 A1 | | 1/2007 | Kozuki et al. | |
| 2009/0068550 A1 | | 3/2009 | Uh et al. | |

(Continued)

FOREIGN PATENT DOCUMENTS

| | | |
|---|---|---|
| DE | 102015007134 A1 | 12/2016 |
| DE | 102018220118 A1 | 5/2020 |

(Continued)

*Primary Examiner* — Muhammad S Siddiquee
(74) *Attorney, Agent, or Firm* — ASLAN LAW, P.C.

(57) ABSTRACT

In order to provide a rupture device which can be produced as simply as possible and which enables a controlled opening of a container in the event of an overpressure, it is proposed that the rupture device comprise a wall component which has at least one rupture web, wherein the at least one rupture web has a thickness varying in the longitudinal direction, and/or wherein the at least one rupture web is formed by at least one first depression, which is arranged on a first side of the wall component, and at least one second depression, which is arranged on a second side, facing away from the first side, of the wall component.

20 Claims, 10 Drawing Sheets

(56)        References Cited

U.S. PATENT DOCUMENTS

| 2017/0179451 | A1 | 6/2017 | Ootsuka |
| 2020/0106077 | A1 | 4/2020 | Yokoshima et al. |

FOREIGN PATENT DOCUMENTS

| EP | 0262070 | A1 | 3/1988 |
| EP | 1321993 | A2 | 6/2003 |
| GB | 2013963 | A | 8/1979 |
| JP | H01309253 | A | 12/1989 |
| KR | 20070030686 | A | 3/2007 |

* cited by examiner

1

RUPTURE DEVICE AND METHOD FOR PRODUCING A RUPTURE DEVICE

RELATED APPLICATION

This application is a continuation of international application No. PCT/EP2021/064852 filed on Jun. 2, 2021 and claims the benefit of German application No. 10 2020 207 110.1 filed on Jun. 5, 2020, which are incorporated herein by reference in their entirety and for all purposes.

FIELD OF DISCLOSURE AND BACKGROUND

The present invention relates to a rupture device and a method for producing a rupture device.

SUMMARY OF THE INVENTION

The object of the present invention is to provide a rupture device which can be produced as simply as possible and enables controlled opening in the event of an overpressure.

This object is achieved by a rupture device which comprises a wall component which has at least one rupture web. The at least one rupture web has a thickness varying in the longitudinal direction.

Additionally or alternatively to the fact that the at least one rupture web has a thickness varying in the longitudinal direction, the at least one rupture web is formed by at least one first depression, which is arranged on a first side of the wall component, and at least one second depression, which is arranged on a second side, facing away from the first side, of the wall component.

The rupture device is suitable, for example, for use in an electrochemical system—for example, an electrochemical cell of an electrochemical system.

Within the electrochemical cell there is a risk of overcharging, in which fluid is released in the interior of the electrochemical cell. This leads in particular to an increase in a pressure in the interior of the electrochemical cell. In particular, there is the risk of a self-reinforcing heat development and an overheating of the electrochemical cell or of adjacent electrochemical cells, as a result of which an explosive inflammation can occur (a so-called "thermal runaway").

In order to control a so-called "thermal runaway" or other thermal event, pressure equalization with a region surrounding the electrochemical cell can be carried out by the rupture device.

As an alternative to the use of the rupture device in an electrochemical system/an electrochemical cell, the rupture device can also be used in other systems in which an opening of a container, e.g., in the region of the at least one rupture web, is to take place when a critical pressure and/or a critical temperature is exceeded in the container.

Preferably, part of the at least one rupture web or the entire at least one rupture web forms a predetermined breaking point. The at least one predetermined breaking point is, for example, a material weak point which is formed by the at least one first depression and/or the at least one second depression.

Particularly in embodiments in which the at least one rupture web is formed at an angle or curved, the longitudinal direction is preferably a circumferential direction of the at least one rupture web.

Preferably, the at least one rupture web defines a rupture web. In particular, the at least one rupture web has a varying material thickness in the direction of extension of the rupture web.

The at least one rupture web is preferably of string-like and/or linear shape. Thus, a rupture behavior of the rupture device can be predefined as exactly as possible. In particular, a rupture device with reproducible rupture behavior can thus be designed.

For easier handling during assembly and/or for the production of the rupture device, it can be advantageous if the at least one rupture web is spaced apart from an outer edge of a region, surrounding the at least one rupture web, of the wall component.

The region, surrounding the at least one rupture web, of the wall component is preferably a base body of the wall component.

The at least one first depression and the at least one second depression are preferably arranged on both sides and/or on opposite sides of the wall component from one another.

Preferably, the first side is an underside and/or an inner side which faces an interior of the container in an installed state of the rupture device.

The second side of the wall component is preferably an upper side of the wall component and/or an outer side facing away from the interior of the container in an installed state of the rupture device.

It can be advantageous if the at least one rupture web is formed by stamping the wall component.

In particular, the at least one first depression and/or the at least one second depression are formed by stamping.

By stamping—in particular, into a solid material without pre-processing—a rupture device with a defined geometry can be produced.

In particular, the at least one first depression and/or the at least one second depression form stamped depressions and/or are introduced into a solid material.

Preferably, the wall component is and/or will be stamped exclusively in the region of the at least one first depression and/or the at least one second depression.

By means of the stamping, a material volume, which has to be displaced, can be minimized. In particular, a processing of larger surfaces of the wall component is rendered unnecessary.

Preferably, the stamping of the wall component can form a rupture diaphragm which is formed in one piece and/or integrally with the region, surrounding the at least one rupture web, of the wall component.

Complex assembly processes of a separately produced rupture diaphragm, e.g., welding of a separate rupture diaphragm, are in particular rendered unnecessary due to the one-piece and/or integral design of the rupture device.

It may be favorable if the at least one first depression and/or the at least one second depression are and/or will be introduced into non-preprocessed regions of the wall component.

The wall component preferably comprises a metallic material, e.g., aluminum, or is formed from a metallic material—for example, aluminum.

It may be advantageous if the at least one rupture web has a closed shape in a cross-section which is taken parallel to a main extension plane of the wall component, the extension of which closed shape is greater in one spatial direction, e.g., by a factor of 2 or more, than in a spatial direction extending perpendicular thereto. For example, the at least one rupture web is asymmetrical in a plan view.

In embodiments in which the wall component part as a whole has a curvature, features which are defined by a relationship to the main extension plane of the wall component preferably relate to a plane arranged perpendicular to a normal of the wall component.

According to a preferred embodiment, the at least one rupture web is formed to be at least approximately oval or at least approximately rectangular in a cross-section taken parallel to the main extension plane of the wall component.

For example, the at least one rupture web is formed in a stadium shape in a cross-section taken parallel to the main extension plane of the wall component.

Alternatively, other shapes of the at least one rupture web are conceivable—for example, further polygonal shapes.

It can be advantageous if the depressions, in the region of the at least one rupture web, in directions extending perpendicular to the main extension plane of the wall component, taper towards the central plane of the wall component.

It can be advantageous if the at least one first depression and/or the at least one second depression are, in a cross-section taken perpendicular to the main extension plane of the wall component, at least approximately triangular, in the shape of an isosceles trapezoid, or arcuate—for example, U-shaped.

For example, the at least one first depression or and/or the at least one second depression are formed in the shape of an isosceles triangle and/or at least approximately V-shaped.

As an alternative to the aforementioned shapes, the at least one first depression and/or the at least one second depression can be designed in the shape of a right triangle and/or in a K-shape.

The at least one first depression and the at least one second depression can have different shapes from one another. For example, the at least one first depression can have a V-shape and the at least one second depression a U-shape.

According to a preferred embodiment, the at least one first depression and the at least one second depression have the same shape.

It may be favorable if the at least one first depression and/or the at least one second depression each have a base region in which an indentation depth of the respective depression is at a maximum.

Preferably, two flank regions each adjoin the respective base region on both sides and connect the base region and non-reprocessed regions of the wall component to one another.

In particular, a ratio of a thickness of the wall component in a region surrounding the at least one rupture web—in particular, from the outside—to a thickness of the at least one rupture web is at least about 2:1 and/or at most about 30:1.

By adjusting the thickness of the at least one rupture web, a reliable opening of the rupture device can be ensured.

The thickness of the wall component preferably denotes an average material thickness and/or an initial material strength—in particular, before the at least one first depression and/or the at least one second depression are introduced.

The thickness of the wall component and/or the thickness of the at least one rupture web are preferably defined perpendicular to the main extension plane of the wall component.

It can be advantageous if the at least one rupture web is arranged and/or designed in such a way that it partially or completely breaks and/or tears when a critical pressure and/or a critical temperature is exceeded.

Preferably, the at least one rupture web breaks and/or tears due to a force caused by a pressure, which force acts transversely to the main extension plane of the wall component.

It can be advantageous if the at least one rupture web has an—in particular, annular—closed shape which surrounds a rupture surface. The rupture surface forms, for example, a rupture diaphragm.

In particular, the rupture surface has a thickness which corresponds at least approximately to a thickness of the region, surrounding the at least one rupture web, of the wall component.

It may be favorable if the at least one rupture web has at least one breaking portion and at least one holding portion. A minimum material thickness of the at least one rupture web in the at least one breaking portion is, in particular, at least about 10%, and in particular at least about 30%, less than a minimum material thickness of the at least one rupture web in the at least one holding portion.

In an assembled state of the rupture device, when a critical pressure and/or a critical temperature is exceeded in an interior of a container which comprises the wall component, the at least one breaking portion preferably forms a predetermined breaking point which breaks and/or tears. Thus, the rupture surface can be pushed outwards and/or unfold to the outside. The rupture device thus enters an open state.

In the mounted state of the rupture device, when a critical pressure and/or a critical temperature is exceeded in an interior of the container which comprises the wall component, the at least one holding portion preferably forms a hinge element and/or a deflection line about which the rupture surface is bent and/or pivoted.

In particular, the at least one holding portion forms a pivot point about which, when the rupture device is opened, a movement of the rupture surface relative to the region, surrounding the at least one rupture web, of the wall component takes place. Thus, a one-sided opening of the rupture device can take place.

By means of the at least one holding portion, it is possible to prevent parts of the wall portion from completely detaching from a base body of the wall portion when the rupture device ruptures. In particular, the at least one holding portion can be used to open the rupture device in a controlled manner.

By means of an, in particular, controlled movement, e.g., a controlled pivoting of the rupture surface about the at least one holding portion, the rupture surface can form a flow guide element for fluid flowing out of the interior space. In particular, a directed fluid flow out of the interior of the container can be formed.

Alternatively to the at least one holding portion being formed by a part of the at least one rupture web, it can be provided that the holding portion be formed by a region, adjoining the at least one rupture web, of the wall component. The at least one rupture web then forms—in particular, as a whole—the at least one breaking portion.

For example, the at least one rupture web is formed to be at least approximately U-shaped in a cross-section taken parallel to the main extension plane of the wall component.

It can be advantageous if a ratio of a thickness of the wall component to a width of the at least one rupture web is at least about 5:1, and in particular at least about 10:1.

The width of the at least one rupture web is preferably identical to a width of the base region of the at least one first depression and/or to a width of the base region of the at least one second depression, and in particular in a direction extending at least approximately parallel to the main extension plane of the wall component.

It can be advantageous if a ratio of a volume formed by the at least one first depression and/or the at least one second depression to a volume of a processed region of the wall component in which the at least one first depression and/or the at least one second depression are arranged is at least about 1:2 and/or at most about 4:1.

In particular, a ratio of a volume formed by the at least one first depression and the at least one second depression to a volume of a processed region of the wall component in which the at least one first depression and the at least one second depression are arranged is at least about 1:2 and/or at most about 4:1.

The volume formed by the at least one first depression and/or the at least one second depression is preferably a volume which has been removed and/or displaced by processing the processed region.

Preferably, the volume formed by the at least one first depression is a volume which is delimited by the flank regions and the base region of the wall component. In addition, the volume formed by the at least one first depression is limited in particular by an extension of a surface of the first side of the wall component in a non-processed region.

The volume formed by the at least one second depression is preferably a volume which is delimited by the flank regions and the base region of the wall component. In addition, the volume formed by the at least one second depression is limited in particular by an extension of a surface of the second side of the wall component in a non-processed region.

It may be favorable if the rupture device comprises several rupture web parts, wherein a rupture web part forms an—in particular, closed—rupture web edge and wherein one or more further rupture web parts form separating rupture webs which divide a rupture surface surrounded by the rupture web edge into several rupture surface parts.

Preferably, the at least one rupture web is at least approximately in a central plane of the wall component.

The central plane of the wall component is preferably at least approximately parallel to the main extension plane of the wall component.

In particular, the wall component has the same indentation depth in the region of the at least one first depression and in the region of the at least one second depression.

Alternatively, it can be provided that an indentation depth in the region of the at least one first depression be at least about 45% smaller, and in particular at least about 40% smaller, than an indentation depth in the region of the at least one second depression.

The invention further relates to a method for producing a rupture device, and in particular for producing a rupture device according to the invention.

The invention is based upon the object of providing a method by means of which a rupture device can be produced as simply as possible.

This object is achieved by a method according to the independent claims directed at a method for producing a rupture device.

According to the method, a wall component is provided. At least one rupture web is introduced into the wall component.

The at least one rupture web has a thickness varying in the longitudinal direction.

Alternatively to the fact that the at least one rupture web has a thickness varying in the longitudinal direction, at least one first depression is introduced on a first side of the wall component and at least one second depression is introduced on a second side facing away from the first side of the wall component, whereby the at least one rupture web is formed.

Preferably, the at least one first depression and the at least one second depression are introduced simultaneously into the wall component—for example, embossed simultaneously.

One or more features described in connection with the rupture device according to the invention and/or one or more advantages described in connection with the rupture device according to the invention preferably apply equally to the method according to the invention.

The present invention further relates to an electrochemical cell and a method for producing an electrochemical cell.

The present invention further relates to an electrochemical system and a method for producing an electrochemical system.

The object of the present invention is to provide an electrochemical cell which can be produced as simply as possible and in which fluid can flow out of the interior space in the event of an overpressure in an interior of the electrochemical cell.

This object is achieved by an electrochemical cell, which comprises a housing, surrounding an interior of the electrochemical cell, and a rupture device, wherein the rupture device is arranged on a wall of the housing and is in particular formed integrally with the wall.

The rupture device comprises at least one rupture web. The at least one rupture web has a thickness which varies in the longitudinal direction and/or is formed by at least one first depression, which is arranged on an inner side, facing the interior, of the wall, and at least one second depression, which is arranged on an outer side, facing away from the interior, of the wall.

In particular, the electrochemical cell is suitable for use in a vehicle.

For example, the electrochemical cell is a lithium-ion battery and/or a lithium-ion accumulator.

In particular, in embodiments in which the at least one rupture web is arcuate or curved, the longitudinal direction is preferably a circumferential direction.

The wall is preferably formed by a wall component. For example, the wall component is a cover element of the electrochemical cell.

It may be favorable if the at least one rupture web is formed by stamping, and in particular by stamping a non-pre-processed region of the wall.

By means of the stamping, a targeted introduction of the at least one rupture web is preferably possible. In particular, a rupture behavior of the rupture device can thereby be set.

By way of example, a selected indentation depth and/or a length of the at least one rupture web can be used to set a rupture pressure which, when exceeded, causes a portion of the at least one rupture web or the at least one rupture web as a whole to break and/or tear.

The rupture pressure is preferably identical to the critical pressure in the interior of the electrochemical cell.

For example, the at least one first depression and the at least one second depression are formed by embossing on both sides into a solid material of the wall.

It can be advantageous if the at least one first depression and/or the at least one second depression have a base region in which an indentation depth of the respective depression is maximal.

It can be advantageous if the rupture device is arranged and/or designed in such a way that, when a critical pressure and/or a critical temperature in the interior of the electrochemical cell is exceeded, the at least one rupture web breaks and/or tears in a partial or complete manner, depending upon its thickness, as a result of which the rupture device goes from a closed state into an open state.

In a closed state of the rupture device, the at least one rupture web connects a rupture surface, surrounded by the at least one rupture web, and a region, which surrounds the at least one rupture web, of the wall component.

In the open state of the rupture device, the rupture surface surrounded by the at least one rupture web is preferably pushed away from the interior and/or unfolded to the outside.

It may be favorable if the at least one rupture web, which has a thickness varying in the longitudinal direction, is formed by a depression which is arranged on the inner side, facing the interior space, of the wall of the electrochemical cell, and in particular is embossed therein. The recess is preferably a first depression.

The rupture device of the electrochemical cell preferably has one or more of the features described in connection with the rupture device according to the invention and/or one or more of the advantages described in connection with the rupture device according to the invention.

It can be advantageous if the at least one rupture web has at least one breaking portion which breaks and/or tears when a critical pressure and/or a critical temperature in the interior of the electrochemical cell is exceeded.

Preferably, the at least one rupture web has at least one holding portion which, when a critical pressure and/or a critical temperature is exceeded in the interior of the electrochemical cell, maintains a connection between a rupture surface, surrounded by the at least one rupture web, and a region, surrounding the at least one rupture web, of the wall and about which the rupture surface is moved, and in particular pivoted.

In embodiments in which the rupture surface comprises several rupture surface parts, which are separated from one another by, for example, separating rupture webs, the at least one rupture web preferably comprises several holding portions. In particular, a rupture surface part is moved, and in particular pivoted, about a holding portion.

The at least one holding portion forms, for example, a deflection line about which the rupture surface is deflected and/or diverted.

For example, the at least one holding portion forms at least one hinge element about which the rupture surface or parts thereof is/are deflected.

Preferably, the rupture surface forms a deflector for a heat flow, which, in the open state of the rupture device, flows out of the interior of the electrochemical cell.

Preferably, the at least one holding portion and the at least one breaking portion form adjacent regions of the at least one rupture web, the thicknesses of which differ from one another, wherein a transition between the regions of different thickness is, for example, stepped.

As an alternative to a stepped transition, it can be provided that the at least one rupture web have a thickness gradient and/or thickness profile.

In an open state of the rupture device, a rupture surface surrounded by the at least one breaking portion preferably forms a flow guide element for fluid flowing out of the interior of the electrochemical cell.

Preferably, the rupture surface forms an opening angle of at least about 100 and/or at most about 80° with a main extension plane of the wall in the open state of the rupture device or during an opening process.

In particular, in the open state of the rupture device, a directional outflow and/or a guided degassing takes place.

The rupture surface forms, for example, a heat deflector.

When the rupture device is opened, the rupture surface preferably has a gas-directing function.

It can be advantageous if the at least one rupture web has an—in particular, annular—closed shape, and is formed to be approximately oval or at least approximately rectangular—for example, in a cross-section taken parallel to a main extension plane of the wall component.

Preferably, a ratio of a length of the breaking portion of the at least one rupture web to a length of the holding portion of the at least one rupture web is at least 2:1 and/or at most 20:1.

It can be advantageous if the breaking portion of the at least one rupture web forms at least approximately a U-shape in a cross-section taken parallel to the main extension plane of the wall, and if the holding portion of the at least one rupture web connects legs of the U-shape to a closed shape.

An embossing for producing a depression and/or a rupture web can be provided, for example, only on one side. The opposite side is then in particular flat and/or unprocessed, and in particular not recessed or embossed.

As an alternative to this, it can also be provided that an embossing on both sides serve to produce the rupture web, wherein indentation depths on the two sides can be different. In particular, it can be provided that an indentation depth for producing the rupture web at least in portions or completely circumferentially on one side be at least approximately twice, and preferably at least approximately five times, e.g., at least approximately ten times, an indentation depth on the further side (opposite side).

Furthermore, alternatively or additionally to an embossing on one side or on both sides, and in particular in addition to an embossing on one side or on both sides for the production of the rupture web, a deformation or shaping for producing a knife-edged ring can be provided. In particular, an optimized positioning and/or guidance during the production of the rupture element can thereby be made possible.

It may be favorable if the first depression, and in particular the single depression, comprises a flank region which forms an inner flank and a flank region which forms an outer flank.

The inner flank is arranged facing the rupture surface. The outer flank is arranged on the side, facing away from the rupture surface, of the rupture web.

It can be advantageous if the inner flank and the outer flank form angles with a main surface and/or the central plane of the rupture element, which angles vary at different points along the rupture web.

For example, it can be provided that, in a breaking portion of the rupture web, and in particular in a backstretch portion opposite a holding portion, which forms an, in particular, straight breaking portion, an angle $\alpha_a$ (alpha a) between the outer flank and the main surface and/or central plane of the rupture element be at least approximately 60°, preferably at least approximately 80°, and in particular at least approximately 85°, and/or at most approximately 90°, and preferably at most approximately 89°. For example, the angle is approximately 88°.

Furthermore, it can be provided that, in the breaking portion of the rupture web, and in particular in the backstretch portion opposite the holding portion, which forms an, in particular, straight breaking portion, an angle $\alpha_i$ (alpha i) between the inner flank and the main surface and/or central plane of the rupture element be at least approximately 35°, preferably at least approximately 40°, and in particular at least approximately 50°, and/or at most approximately 75°, and preferably at most approximately 65°. For example, the angle is approximately 60°.

For example, it can be provided that, in a holding portion of the rupture web, an angle $\beta_a$ (beta a) between the outer flank and the main surface and/or central plane of the rupture element be at least approximately 60°, preferably at least approximately 80°, and in particular at least approximately 85°, and/or at most approximately 90°, and preferably at most approximately 89°. For example, the angle is approximately 88°.

Furthermore, it can be provided that, in the holding portion of the rupture web, an angle $\beta_i$ (beta i) between the inner flank and the main surface and/or central plane of the rupture element be at least approximately 35°, preferably at least approximately 40°, and in particular at least approximately 50°, and/or at most approximately 75°, and preferably at most approximately 65°. For example, the angle is approximately 600.

For example, it can be provided that, in one or in two curved portions of the rupture web, which form a breaking portion and in particular each connect a holding portion with a backstretch portion, an angle $\gamma_a$ (gamma a) between the outer flank and the main surface and/or central plane of the rupture element be at least approximately 30°, preferably at least approximately 40°, and in particular at least approximately 50°, and/or at most approximately 80°, and preferably at most approximately 70°. For example, the angle is approximately 60°.

Furthermore, it can be provided that, in one or in two curved portions of the rupture web, which form a breaking portion and in particular each connect a holding portion with a backstretch portion, an angle $\gamma_i$ (gamma i) between the inner flank and the main surface and/or central plane of the rupture element be at least approximately 30°, preferably at least approximately 40°, and in particular at least approximately 50°, and/or at most approximately 80°, and preferably at most approximately 70°. For example, the angle is approximately 60°.

The angle $\alpha_i$ (alpha i) is preferably smaller than the angle $\alpha_a$ (alpha a). Alternatively or additionally, it can be provided that the angle $\beta_i$ (beta i) be smaller than the angle $\beta_a$(beta a).

The angle $\gamma_i$ (gamma i) is preferably at least approximately equal to the angle $\gamma_a$ (gamma a).

By means of the described angle selection, in particular, an optimized and reliable opening of the rupture element can be made possible, wherein, further, a complete detachment of the rupture surface from the surrounding region can preferably be prevented. Furthermore, a desired opening angle of the rupture surface can preferably be set, wherein the opening angle indicates the angle by which the rupture surface rotates around the holding portion until it comes into an open position.

It can be provided that a thickness of the rupture web in one or more or all of the breaking portions be smaller than in the holding portion.

In addition, the rupture web in the holding portion is preferably designed to be wider, which is attainable in particular in that an embossing tool for producing the rupture element has flanks largely similar in shape to those in the backstretch portion, but, at its end defining the rupture web, is flattened and/or shortened.

It may be favorable if the rupture element, and in particular the rupture web, is designed, and in particular dimensioned, such that the rupture element fails when a differential pressure is reached between an inner side and an outer side of more than 4 bar, in particular more than 7 bar, and preferably approximately at 9 bar, and thereby clears an opening between the inner side and the outer side.

An indentation depth of the first depression is preferably greater than an indentation depth of the second depression, wherein the first depression is preferably arranged on an outer side, facing away from a pressure chamber, of the rupture element.

With only one-sided embossing, the single depression for producing the rupture web is preferably arranged on the outer side facing away from the pressure chamber.

Optionally, in addition to one-sided embossing, a counter-embossing with a low indentation depth can be provided.

In principle, the aforementioned information is suitable for optimizing a first depression and/or a second depression.

The invention further relates to a method for producing an electrochemical cell, and in particular for producing an electrochemical cell according to the invention.

In this respect, the object of the invention is to provide a method by means of which an electrochemical cell can be produced as simply as possible.

This object is achieved by a method according to the independent claim directed at a method for producing an electrochemical cell.

According to the method, a wall of a housing of an electrochemical cell, and in particular a cover element, is provided.

At least one rupture web is introduced into the wall.

The at least one rupture web has a thickness varying in the longitudinal direction.

Additionally or alternatively to the at least one rupture web having a thickness varying in the longitudinal direction, at least one first depression is introduced on a first side of the wall, and at least one second depression is introduced on a second side facing away from the first side of the wall, as a result of which the at least one rupture web is formed.

Preferably, the at least one first depression and the at least one second depression are simultaneously introduced into the wall of the electrochemical cell.

In particular, the wall is connected to one or more further housing components, so that an interior of the electrochemical cell is surrounded by the housing of the electrochemical cell.

One or more of the features described in connection with the electrochemical cell according to the invention and/or one or more of the advantages described in connection with the electrochemical cell according to the invention preferably apply equally to the method according to the invention.

For example, the at least one rupture web is embossed into the wall of the electrochemical cell.

The present invention further relates to an electrochemical system.

The object of the invention is to provide an electrochemical system which can be produced as simply as possible.

This object is achieved according to the invention by an electrochemical system according to the independent claim directed at an electrochemical system.

The electrochemical system comprises one or more electrochemical cells according to the invention.

Additionally or alternatively, the electrochemical system comprises a housing, surrounding an interior of the electrochemical system, and a rupture device, which is arranged on a wall of the housing and is in particular formed integrally with the wall.

The rupture device comprises at least one rupture web.

The at least one rupture web has a thickness varying in the longitudinal direction and/or is formed by at least one first depression, which is arranged on an inner side, facing the interior space, of the wall of the electrochemical system, and at least one second depression, which is arranged on an outer side, facing away from the interior, of the wall of the electrochemical system.

The electrochemical system according to the invention preferably has one or more of the features described in connection with the electrochemical cell according to the invention and/or one or more of the advantages described in connection with the electrochemical cell according to the invention.

The present invention further relates to a method for producing an electrochemical system, and in particular an electrochemical system according to the invention.

In this respect, the object of the invention is to provide a method by means of which an electrochemical system can be produced as simply as possible.

This object is achieved by a method for producing an electrochemical system according to the independent claim directed at a method for producing an electrochemical system.

A wall of a housing of an electrochemical system is provided. At least one rupture web is introduced into the wall. The at least one rupture web has a thickness varying in the longitudinal direction.

Additionally or alternatively, at least one first depression is introduced on a first side of the wall, and at least one second depression is introduced on a second side facing away from the first side of the wall, as a result of which the at least one rupture web is formed.

Preferably, the at least one first depression and the at least one second depression are simultaneously introduced into the wall.

In particular, the wall is connected to one or more further housing components, so that an interior of the electrochemical system is surrounded by the housing of the electrochemical system.

Preferably, the at least one first depression and the at least one second depression are introduced into the wall of the electrochemical system by stamping.

The method according to the invention for producing an electrochemical system preferably has one or more features of the electrochemical cell according to the invention and/or one or more advantages of the electrochemical cell according to the invention.

Further preferred features and/or advantages of the invention form the subject matter of the following description and the drawings illustrating exemplary embodiments.

Identical or functionally equivalent elements are labeled with the same reference signs in all figures.

DETAILED DESCRIPTION OF THE DRAWINGS

Figure 1:
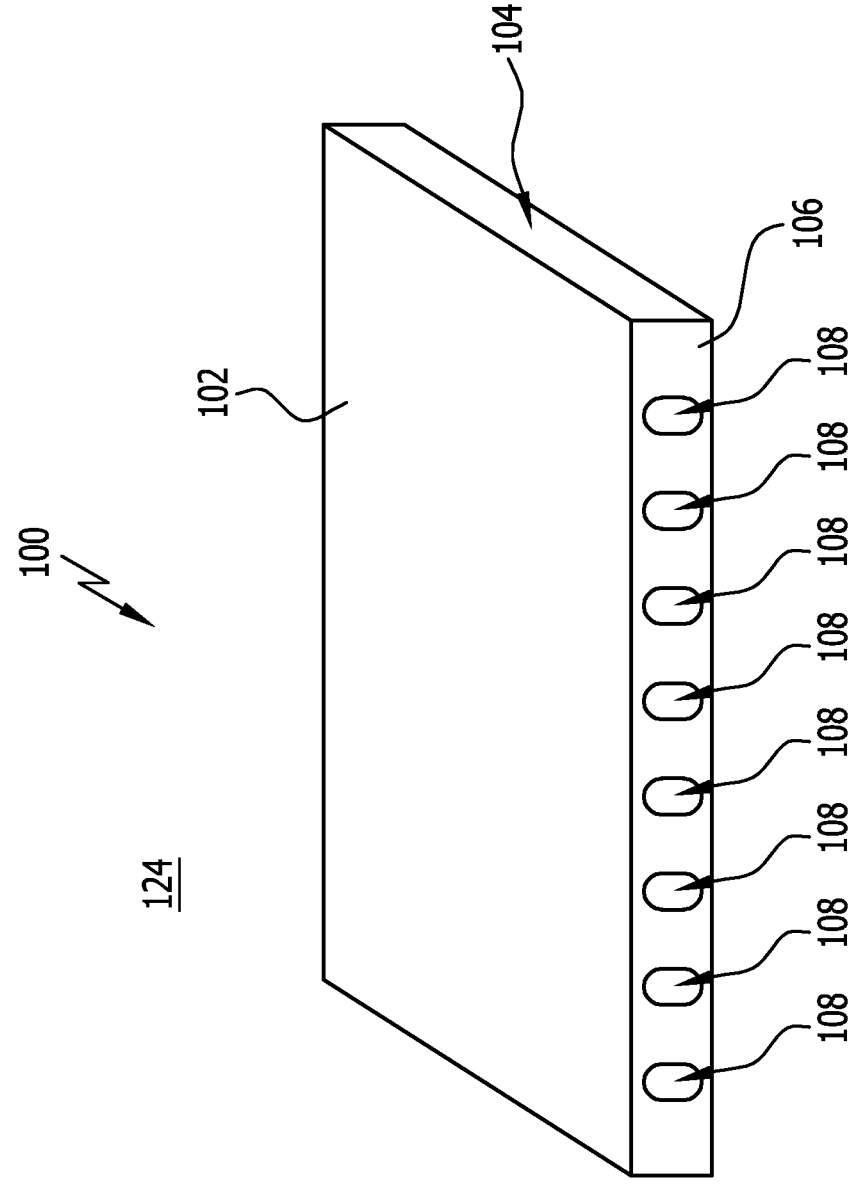
FIG. 1 is a schematic perspectival view of an embodiment of an electrochemical system comprising several rupture devices.

FIG. 1 shows a housing 102 of an electrochemical system designated as a whole by 100.

The electrochemical system 100 is preferably suitable for use in a vehicle. For example, the electrochemical system 100 is a battery module.

In the present case, the housing 102 is at least approximately cuboid and surrounds an interior space 104 of the electrochemical system 100. Several rupture devices 108 are arranged in the present case on a wall 106 of the housing 102, which wall is designed as a secondary side.

Figure 2:
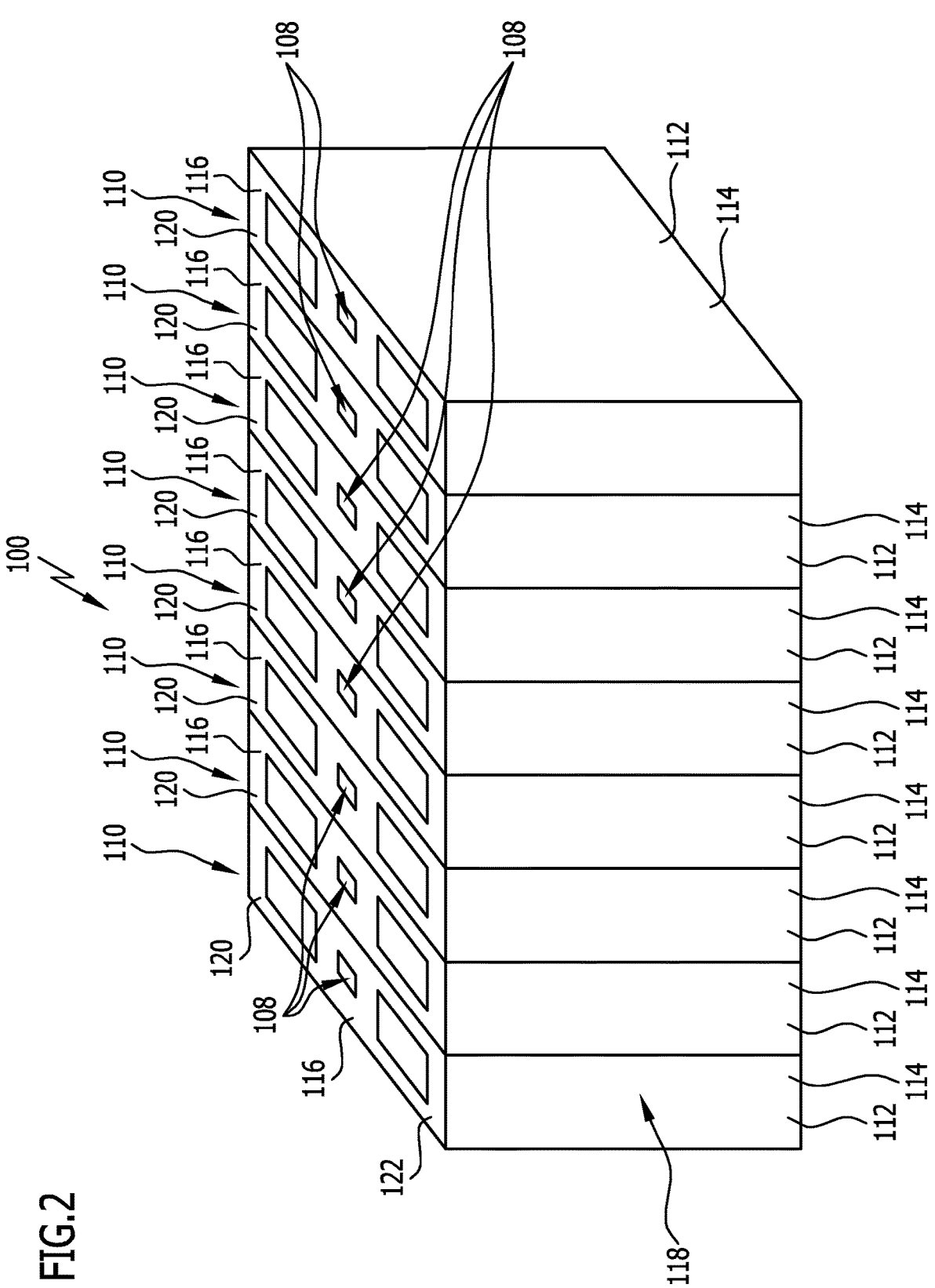
FIG. 2 is a schematic perspectival view of several electrochemical cells of the electrochemical system from FIG. 1, wherein, on and/or in each cover element of the electrochemical cells, a rupture device is arranged centrally between cell terminals.

In the present case, several electrochemical cells 110 are arranged in the interior space 104 of the electrochemical system 100 (cf. FIG. 2).

For example, the several electrochemical cells 110 are prismatic electrochemical cells.

Preferably, the several electrochemical cells 110 are lithium-ion batteries and/or lithium-ion accumulators.

In the present case, each of the electrochemical cells 110 comprises an at least approximately cup-shaped first housing component 112 of a housing 114. In the present case, the first housing component 112 is respectively covered and/or closed by a second housing component 116 of the housing 114—in particular, in such a way that an interior 118 of the respective electrochemical cell 110 is enclosed in a fluid-tight manner.

In the present case, the second housing component 116 is a cover element 120.

In the present case, the cover elements 120 each form a wall 122 of the housing 114 of the respective electrochemical cell 110, on and/or in which a rupture device 108 is arranged.

As an alternative to the fact that rupture devices 108 are arranged both on and/or in a wall 106 of the housing 102 of the electrochemical system 100 and/or in walls 122 of the electrochemical cells 110, it can be provided that either exclusively on and/or in the wall 106 of the housing 102 of the electrochemical system 100 or exclusively on/or in a wall 122 of one or more electrochemical cells 110, one or more rupture devices 108 are provided.

The rupture devices 108 are preferably used to equalize the pressure between an interior space 104 of the electrochemical system 100 and an environment 124 of the electrochemical system 100 in the event that a critical pressure and/or a critical temperature in the interior 104 of the electrochemical system 100 is exceeded.

Additionally or alternatively, the rupture devices 108 each serve a pressure equalization between an interior 118 of one or more electrochemical cells 110 and an environment of the respective electrochemical cell 110 in the event that a critical pressure and/or a critical temperature in the interior 118 of the respective electrochemical cell 110 is exceeded.

In FIGS. 1 and 2, the rupture devices 108 are shown purely schematically.

FIGS. 3 through 8 show in detail a preferred embodiment of a rupture device 108 as it can be used, for example, in the electrochemical system 100 and/or the electrochemical cells 110. This preferred embodiment will be described in detail below.

As an alternative to use in an electrochemical system 100 and/or one or more electrochemical cells 110, the rupture device 108 is suitable for use in further systems in which a pressure equalization between the interior and the surroundings of the container is to be brought about when a critical pressure and/or a critical temperature in an interior of a container is exceeded.

In the present case, the rupture device 108 comprises a wall component 126. The wall component 126 can, for example, completely form a wall 106 of a housing 102 of an electrochemical system 100, or a wall 122, e.g., a cover element 120, of a housing 114 of an electrochemical cell 110 (cf. FIGS. 1 and 2).

It can be advantageous if the wall component 126 comprises a metallic material or is formed therefrom. For example, the wall component 126 comprises aluminum or is formed thereof.

In the present case, the wall component 126 is formed to be at least approximately planar and/or flat.

In the present case, the wall component 126 has a rupture web 128, which is formed to be at least approximately oval, e.g., stadium-shaped, in a cross-section taken parallel to a main extension plane of the wall component 126.

Alternatively, it can be provided that the rupture web 128 be at least approximately rectangular in a cross-section taken parallel to a main extension plane of the wall component 126 (indicated schematically in FIG. 2).

The rupture web 128 can alternatively have a shape deviating from the aforementioned shapes, wherein the rupture web 128 preferably has an extension in a cross-section taken perpendicular to the main extension plane of the wall component 126, which extension is larger in one spatial direction, e.g., by a factor of 2, than in a spatial direction extending perpendicular thereto. The spatial directions preferably run parallel to the main extension plane of the wall component 126.

For example, further polygonal shapes of the rupture web 128 are conceivable (not shown in the drawing).

The wall component 126 can also have several rupture webs 128 (not shown in the drawing).

Preferably, a ratio of a thickness of the wall component 126 in a region 152 surrounding the rupture web 128—in particular, from the outside—to a thickness of the rupture web 128 is at least about 2:1 and/or at most about 30:1.

The thickness of the wall component 126 preferably denotes a material thickness, e.g., an initial material strength, of the wall component 126—in particular, in a state before processing the wall component 126 and/or in a state before the rupture web 128 is introduced.

A thickness of the rupture web 128 preferably designates a material thickness of the wall component 126 in the region of the rupture web 128 and/or a material thickness of the wall component 126 after processing and/or after the rupture web 128 has been introduced. The thickness of the rupture web 128 is in particular a minimum thickness of the wall component 126.

In the present case, the rupture web 128 has a varying thickness along its longitudinal direction 130, which in the present case is a circumferential direction 132.

In the present case, part of the rupture web 128 forms a predetermined breaking point 134.

According to alternative embodiments, the rupture web 128 as a whole forms a predetermined breaking point 134.

As can be seen in particular in FIGS. 5 through 8, the rupture web 128 is preferably formed by a first depression 136 and a second depression 138 in the wall component 126.

The first depression 136 and the second depression 138 are, for example, string-shaped and/or linear.

The first depression 136 and the second depression 138 are preferably arranged on opposite sides of the wall component 126. Preferably, the first depression 136 and the second depression 138 have the same shape and/or the same indentation depth.

The first depression 136 is preferably arranged on a first side 140 of the wall component 126. The second depression 138 is preferably arranged on a second side 142 opposite the first side 140 of the wall component 126 and/or facing away from the first side 140 of the wall component 126.

In embodiments in which the rupture device 108 forms a component of a housing 102 of an electrochemical system 100, the first side 140 of the wall component 126 forms, for example, an inner side of the wall 106, facing the interior space 104, of the electrochemical system 100. The second side 142 forms, for example, an outer side, facing away from the interior space 104, of the wall 106.

In embodiments in which the rupture device 108 forms a component of an electrochemical cell 110, the first side 140 forms, for example, an inner side, facing the interior 118, of the wall 122. The second side 142 preferably forms an outer side, facing away from the interior 118, of the wall 122.

It can be advantageous if a ratio of a thickness of the wall component 126 to a width of the rupture web 128 is at least about 5:1, and in particular at least about 10:1.

The width of the rupture web 128 is preferably identical to a width of a base region 156 of the first depression 136 and/or a width of a base region 156 of the second depression 138.

The base regions 156 are preferably those regions in which the depressions 136, 138 each have a maximum indentation depth.

In the present case, the rupture web 128 has an—in particular, annular—closed shape. In the present case, the rupture web 128 surrounds a rupture surface 144, which forms, for example, a rupture diaphragm.

Figure 3:
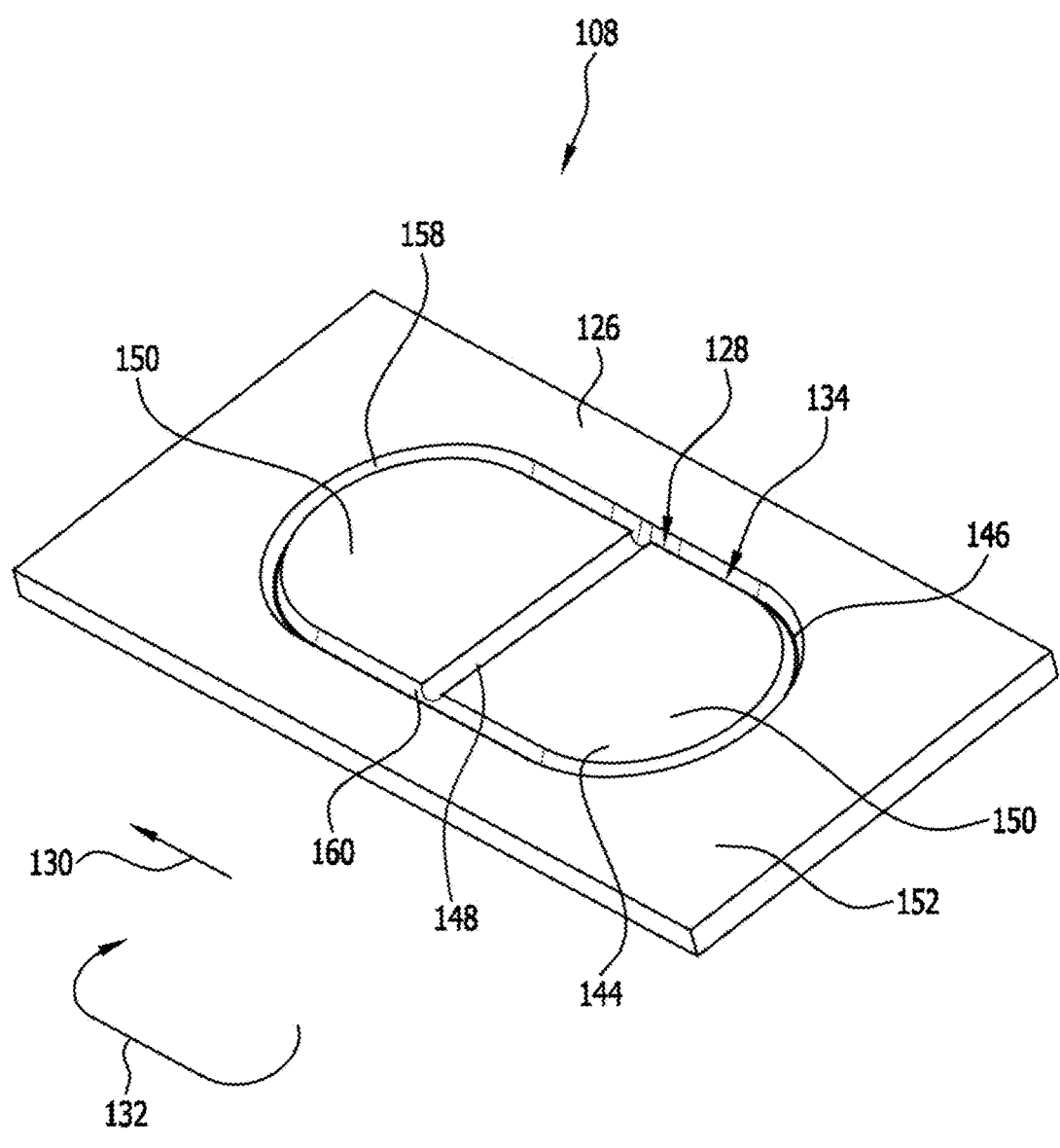
FIG. 3 is a schematic perspectival view of an embodiment of a rupture device in the closed state, wherein a wall component of the rupture device has a rupture web which is at least approximately oval in a plan view.
Figure 4:
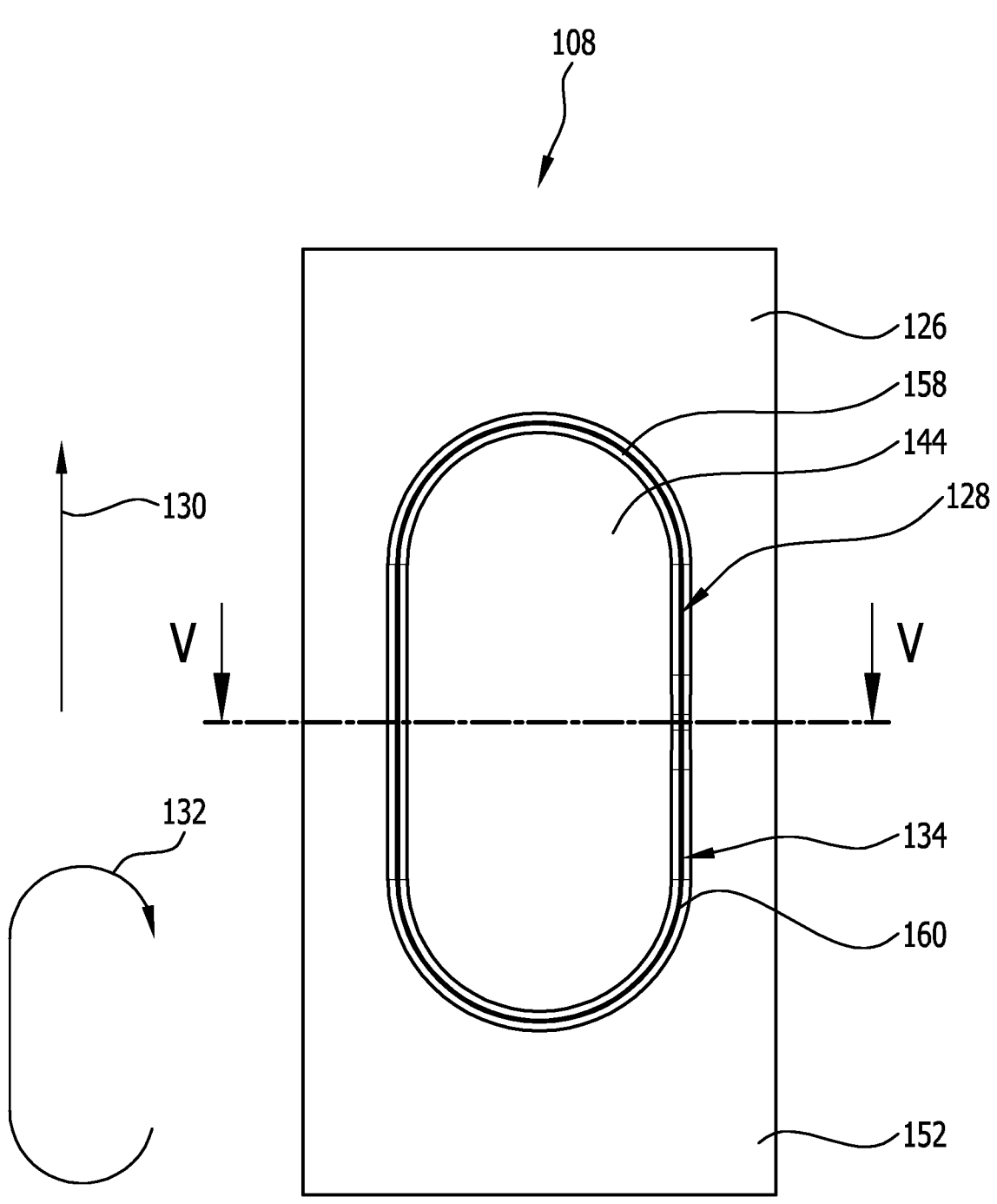
FIG. 4 is a schematic plan view of a rupture device from FIG. 3.
Figure 5:
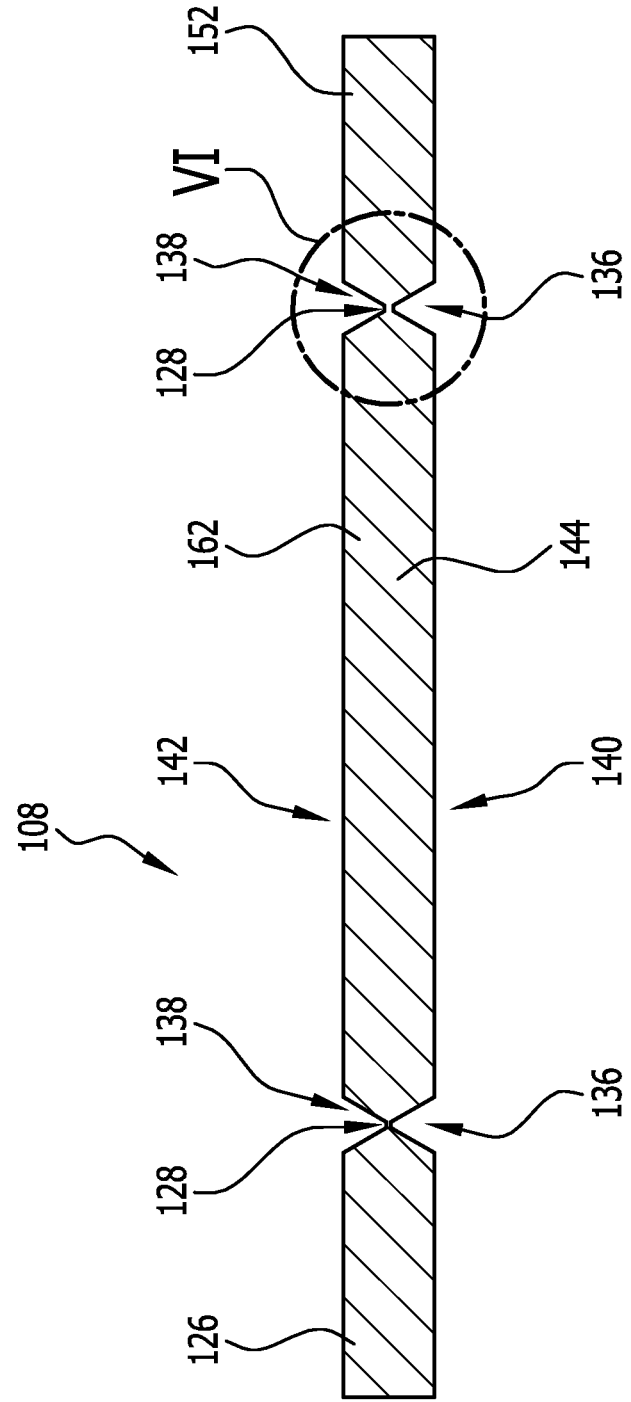
FIG. 5 is a schematic sectional illustration through the rupture device of FIGS. 3 and 4 along a plane denoted by V in FIG. 4.
Figure 6:
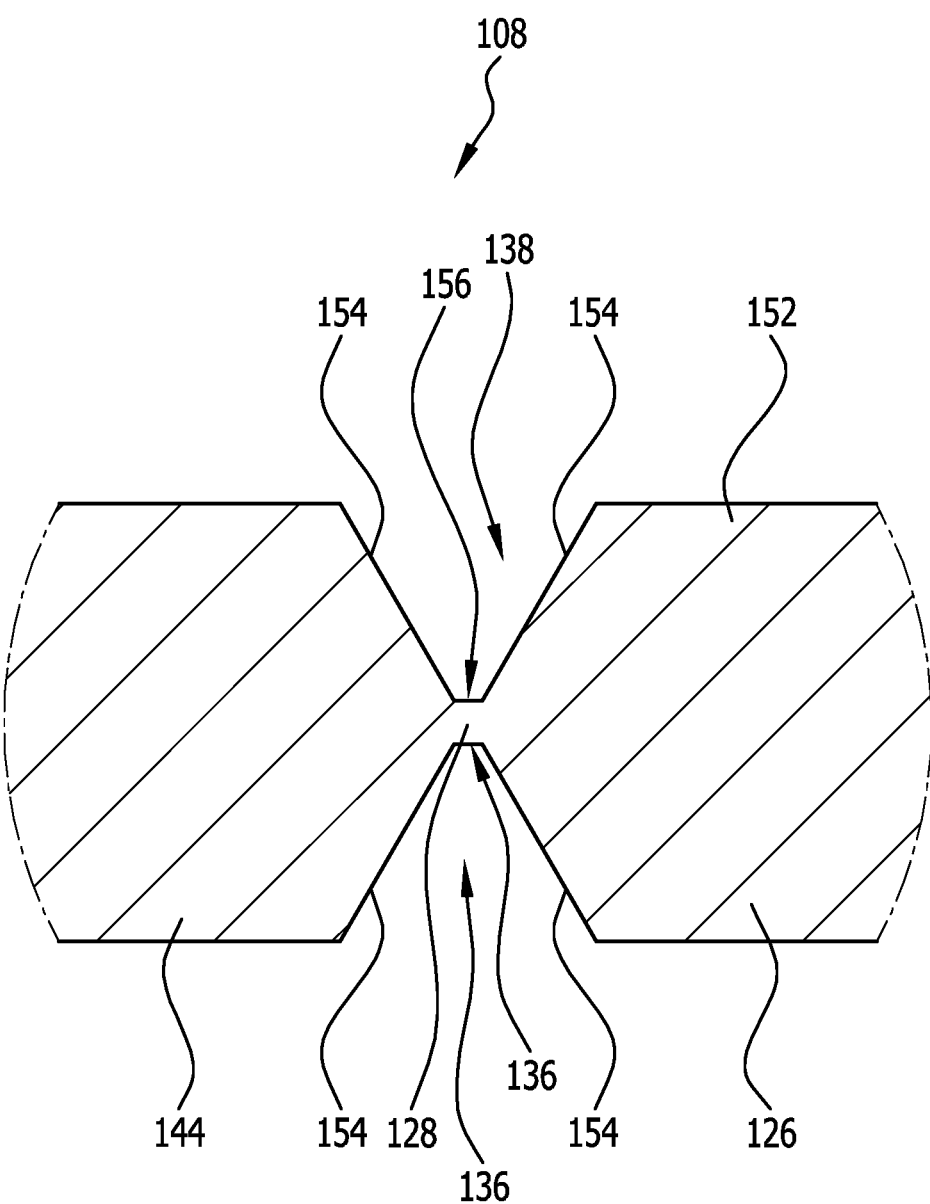
FIG. 6 is an enlarged view of the region denoted by VI in FIG. 5.

As is indicated in FIG. 3 by a dashed line, it can be provided that the rupture web 128 be formed in multiple parts.

For example, the rupture web 128 has a—for example, closed—rupture web edge 146 and one or more separating rupture webs 148, which divide the rupture web edge 146 into several segments. In the present case, the rupture surface 144 is divided into several rupture surface parts 150 by the separating rupture webs 148.

For a controlled breaking and/or tearing of the rupture web 128 when a critical pressure and/or a critical temperature is exceeded in an interior of a container which is partially formed by the wall component 126, it can be advantageous if a thickness of the rupture surface 144 and a thickness of the wall component 126 in a region 152 surrounding the rupture web 128 (from the outside) is at least approximately identical.

The first depression 136 and the second depression 138 are preferably introduced into the wall component 126 by stamping. For example, the wall component 126 is stamped for producing the rupture device 108—in particular, on both sides.

By stamping the wall component 126, elaborate assembly processes for mounting a separate rupture diaphragm are, in particular, rendered unnecessary.

In the present case, the first depression 136 and the second depression 138 in a cross-section taken perpendicular to the main extension plane of the wall component 106 are formed at least approximately in the shape of an isosceles trapezoid.

For example, a tool which is used for making the first depression 136 and the second depression 138, e.g., an embossing tool, has elements whose shape is complementary to the shape of the first depression 136 and the second depression 138. These elements are preferably pressed simultaneously into the wall component 126.

As an alternative to a shape of an isosceles trapezoid of the first depression 136 and of the second depression 138, it can be provided that the first depression 136 and/or the second depression 138 be designed, in a cross-section that is taken perpendicular to the main extension plane of the wall component 126, in the shape of an isosceles triangle, of a right triangle, or to be arcuate (not shown in the drawing).

The first depression 136 and the second depression 138 can also have shapes deviating from one another (not shown in the drawing).

Preferably, the first depression 136 and the second depression 138 are each formed by two flank regions 154 of the wall component 126, wherein the two flank regions 154 each receive a base region 156 between them and/or adjoin the respective base region 156 laterally.

Preferably, main extension planes of the two flank regions 154 of the first depression 136 form an angle of at least about 300 and/or at most about 800 with one another.

Main extension planes of the two flank regions 154 of the second depression 138 preferably form an angle of at least about 30° and/or at most about 80° with one another.

In the present case, the rupture web 128 is formed by the base region 156 of the first depression 136 and the base region 156 of the second depression 138.

In the present case, the rupture web 128 lies at least approximately in a central plane of the wall component 126, and in particular in such a way that the rupture web 128 is arranged centrally between the first side 140 and the second side 142 of the wall component 126.

The indentation depth in the region of the first depression 136 and the indentation depth in the region of the second depression 138 are identical in the present case.

According to an alternative embodiment (not shown in the drawing), it can be provided that the indentation depth in the region of the first depression 136 be at least about 45% smaller, and in particular at least about 40% smaller, than the indentation depth in the region of the second depression 138, or vice versa.

In the present case, the rupture web 128 comprises a holding portion 158 and a breaking portion 160.

In the present case, a minimum material thickness of the rupture web 128 in the breaking portion 160 is at least about 10% less, and in particular at least about 30% less, than a minimum material thickness of the rupture web 128 in the holding portion 158.

In the present case, the breaking portion 160 at least approximately forms a U-shape in a cross-section taken parallel to the main extension plane of the wall component 126.

The holding portion 158 is preferably formed to be at least approximately curved in a cross-section taken parallel to the main extension plane of the wall component 126 and/or connects free ends of the legs of the U-shape of the breaking portion 160.

According to one embodiment (not shown in the drawing), it can, alternatively to the rupture web 128 having a closed shape, be provided that the holding portion 158 be formed by a region, adjoining the rupture web 128, of the wall component 126. The rupture web 128 then forms—in particular, as a whole—the breaking portion 160 and/or a predetermined breaking point 134.

By choosing a thickness of the holding portion 158 and/or of the breaking portion 160, a rupture pressure can preferably by set which, when exceeded, causes a portion of the rupture web 128 or the rupture web 128 as a whole to break and/or tear.

A transition from the holding portion 158 to the breaking portion 160 can be done so as to be stepped or by a thickness gradient.

When a critical pressure (rupture pressure) and/or a critical temperature is exceeded in an interior of a container which comprises the wall component 126, the breaking portion 160 of the rupture web 128 preferably breaks and/or tears.

During and/or after the breaking and/or tearing of the breaking portion 160, the rupture surface 144 is preferably pushed away from the interior and/or folded outwards.

Thus, the rupture device 108 goes from a closed state to an open state, and/or fluid can flow out of the interior of the container into the surroundings (not shown in the drawing).

During a movement of the rupture surface 144 relative to a region 152, surrounding the rupture web 128, of the wall component 126, the holding portion 158 preferably forms a hinge element and/or a deflection line about which the rupture surface 144 is moved and/or pivoted.

For example, when the rupture device 108 is opened, the rupture surface 144 is deflected and/or folded around the holding portion 158.

During an opening process and/or in an open state of the rupture device 108, the rupture surface 144 preferably forms a flow guide element 162.

The flow guide element 162 is preferably used for a line of fluid flowing out of the container and/or as a heat shield for thermal dissipation and/or shielding.

It can be advantageous if, in an open state of the rupture device 108, the flow guide element 162 forms an angle of at least about 100 and/or at most about 80° with a main extension plane of the region 152, surrounding the rupture web 128, of the wall component 126 (not shown in the drawing).

During an opening process of the rupture device 108 and/or in an open state of the rupture device 108, the holding portion 158 remains unchanged compared to the closed state of the rupture device 108. In particular, there remains a connection of the rupture surface 144 and of the region 152, surrounding the rupture web 128, of the wall component 126 in the region of the holding portion 158, even in an open state of the rupture device 108.

In particular, for adjusting an opening speed, it may be advantageous if a ratio of a length of the breaking portion 160 to a length of the holding portion 158 is at least about 2:1 and/or at most about 20:1.

In embodiments in which the rupture surface 144 is divided into several rupture surface parts 150, the one or more separating rupture webs 148 preferably form one or more components of the breaking portion 160. For example, the rupture web 128 has several holding portions 158, each of which is curved and connects straight portions of the rupture web 128 to one another. The straight portions of the rupture web 128 in particular each form a breaking portion 160.

For example, the rupture web 128 comprises, in a centrally-arranged position, a separating support web 148 which is designed as a breaking portion 160 (cf. FIG. 3) and which breaks and/or tears when a critical pressure and/or a critical temperature in the interior of the container which comprises the rupture device 108 is exceeded.

In particular, the rupture surface parts 150 fold outwards. The holding portions 158 each form, for example, a hinge element and/or a deflection line about which the breaking portions 160 are moved and/or pivoted.

For example, the rupture surface parts 150 are folded away from one another and/or outwards when the rupture device 108 is opened.

It can be advantageous if a ratio of a volume formed by the first depression 136 and the second depression 138 to a volume of a processed region of the wall component 126, in which the first depression 136 and the second depression 138 are arranged, is at least about 1:2 and/or at most about 4:1.

The volume formed by the first depression 136 and the second depression 138 is preferably a sum of volumes each delimited by two flank regions 154 and the base region 156 arranged therebetween, which volumes are delimited, respectively, by an extension of the first side 140 or the second side 142.

Figure 7:
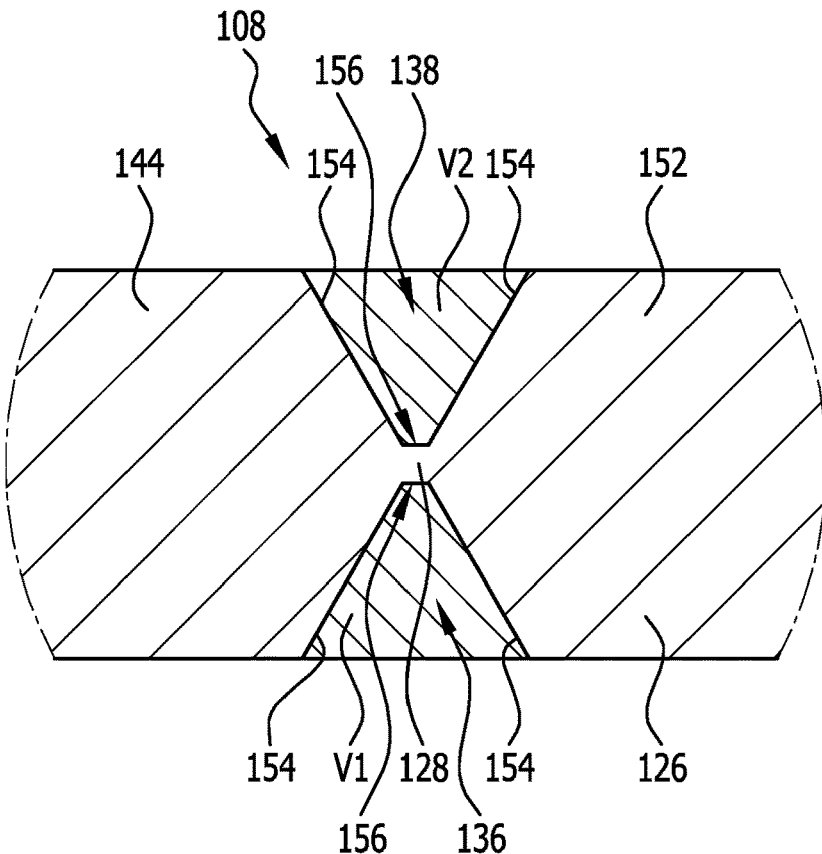
FIG. 7 shows a schematic sectional illustration, corresponding substantially to FIG. 6, of the rupture device from FIGS. 3 through 6, wherein a volume is shown in the region of which material has been displaced and/or removed when a first depression and a second depression are introduced.

The volume formed by the first depression 136 and the second depression 138 is shown hatched in FIG. 7 and denoted by V1 in the region of the first depression 136 and by V2 in the region of the second depression 138.

The volume V1 formed by the first depression 136 is preferably a material volume which has been removed and/or displaced from the wall component 126 for producing the first depression 136. The volume V2 formed by the second depression 138 is preferably a material volume which has been removed and/or displaced from the wall component 126 for producing the second depression 138.

Figure 8:
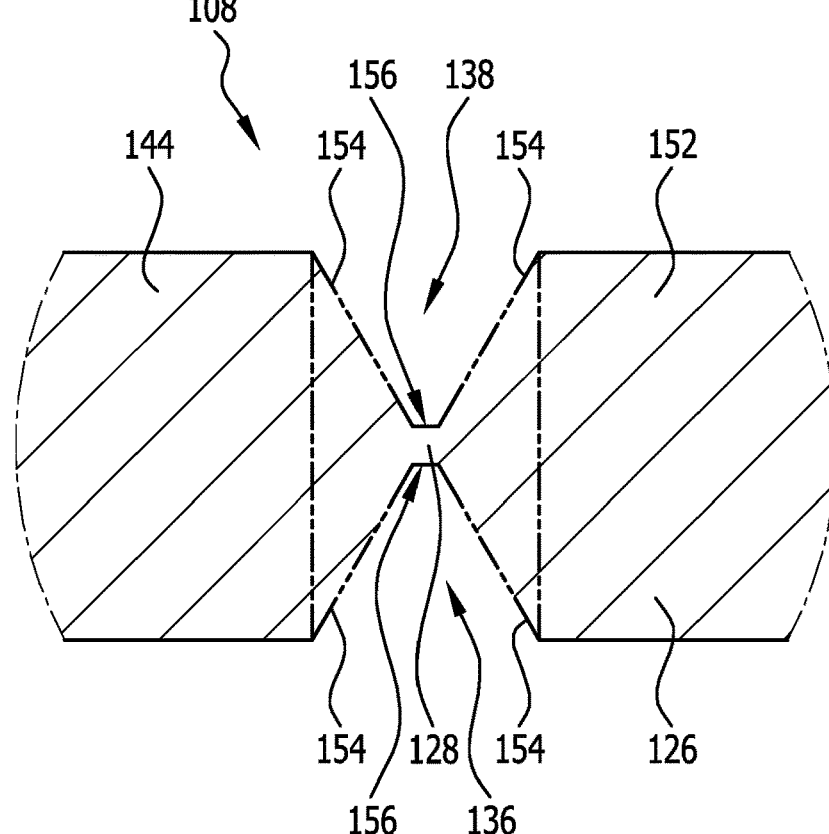
FIG. 8 shows a schematic sectional illustration, corresponding substantially to FIG. 6, of the rupture device from FIGS. 3 through 7, wherein a volume of a region of the wall component which is processed during the introduction of the rupture web is shown.

The processed region in the wall component 126 is shown in FIG. 8 by a dash-dotted line. This is preferably a region of the wall component 126 on which force was exerted during the introduction of the first depression 136 and the second depression 138, and/or which is under an influence of the tool.

In order to produce the electrochemical system 100, a wall 106 is preferably provided in which recesses 136, 138 are introduced, e.g., stamped, on both sides—in particular, in such a way that at least one rupture web 128 is formed.

In this case, a tool is in particular set such that the depressions 136, 138 in each case have a varying thickness along their longitudinal directions 130—for example, at least two portions of different indentation depth.

Subsequently, the wall 106 is preferably joined, e.g., welded, to a further housing component—in particular, in a fluid-tight manner.

An electrochemical cell 110 is preferably produced in that recesses 136, 138 are introduced, e.g., stamped, into a wall 122 on both sides. In particular, at least one rupture web 128 is formed by stamping. In an assembled state of the electrochemical cell 110, the wall 122 preferably forms a cover element 120.

An indentation depth is preferably varied in this case along a longitudinal direction 130 of the first depression 136 and along a longitudinal direction 130 of the second depression 138. In particular, at least two portions are formed, in the region of which the first depression 136 and/or the second depression has/have indentation depths which differ from one another.

After the stamping, the wall 122 is preferably connected, e.g., welded, to a—for example, cup-shaped—housing component 112. In particular, a housing 114 of the electrochemical cell 110 is thus formed which is closed in a fluid-tight manner when the rupture device 108 is in a closed state.

The rupture device 108 preferably provides a rupture device which shows a controlled breaking behavior.

Figure 9:
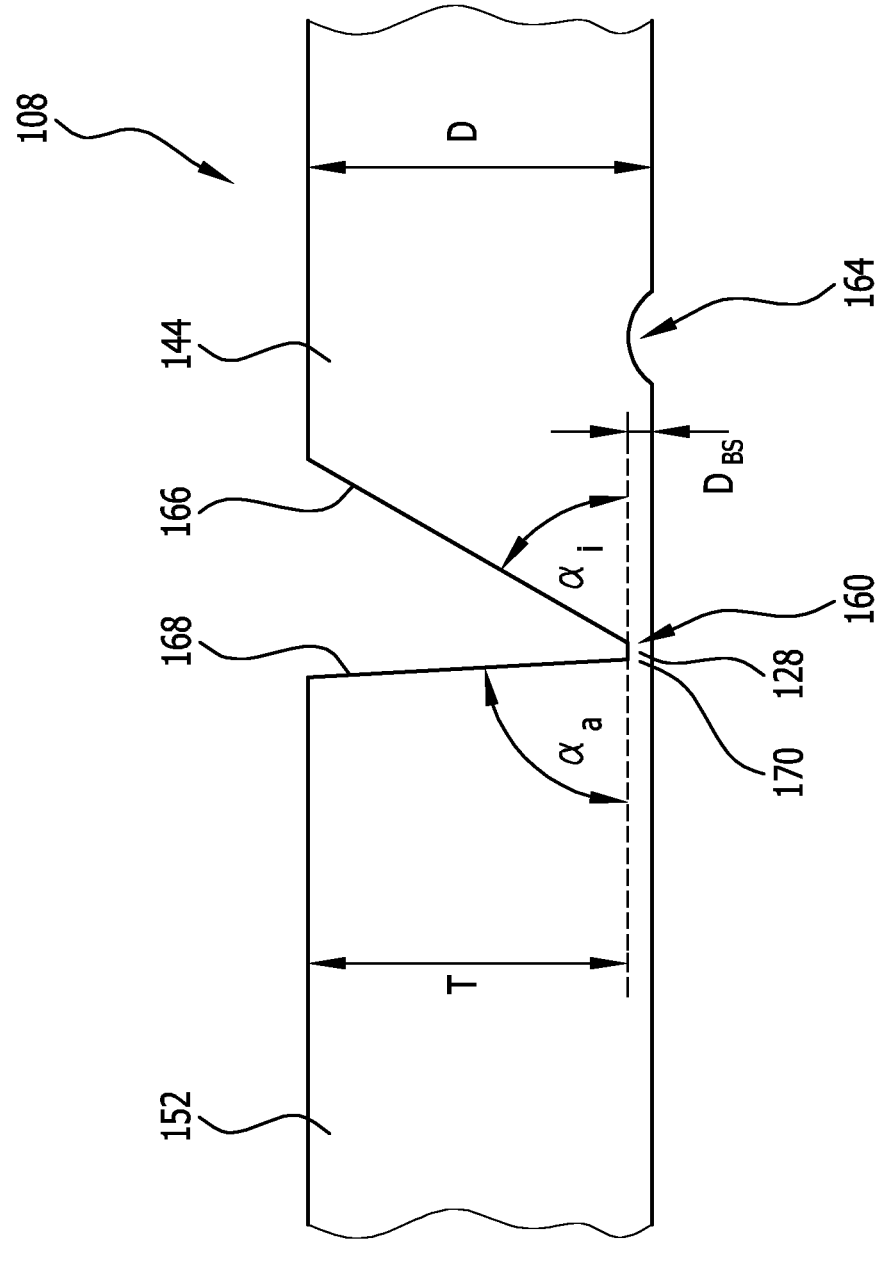
FIG. 9 shows a section similar to FIG. 6 through a backstretch portion of an alternative embodiment of a rupture device.
Figure 10:
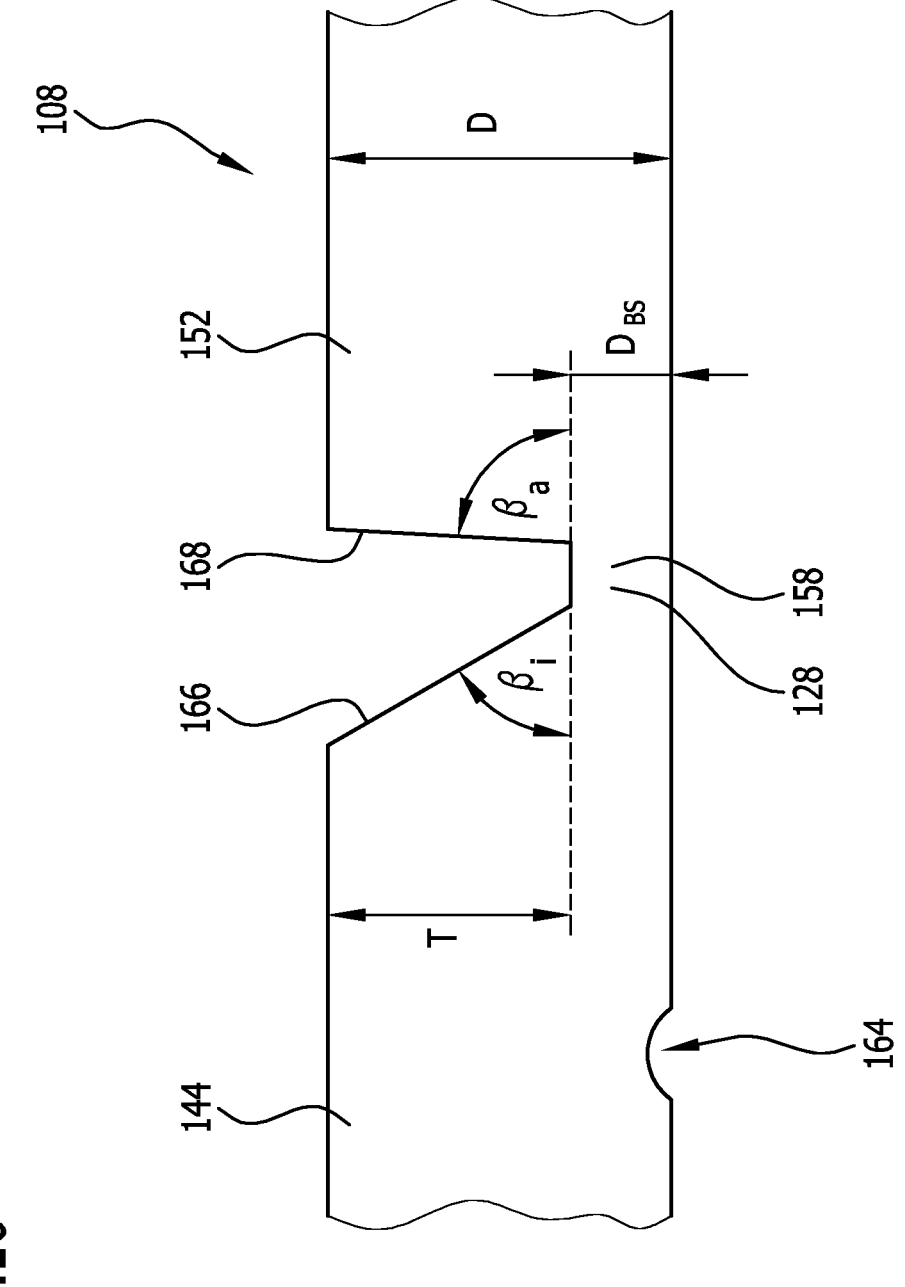
FIG. 10 shows a section corresponding to FIG. 9 through a holding portion of the rupture device of FIG. 9.
Figure 11:
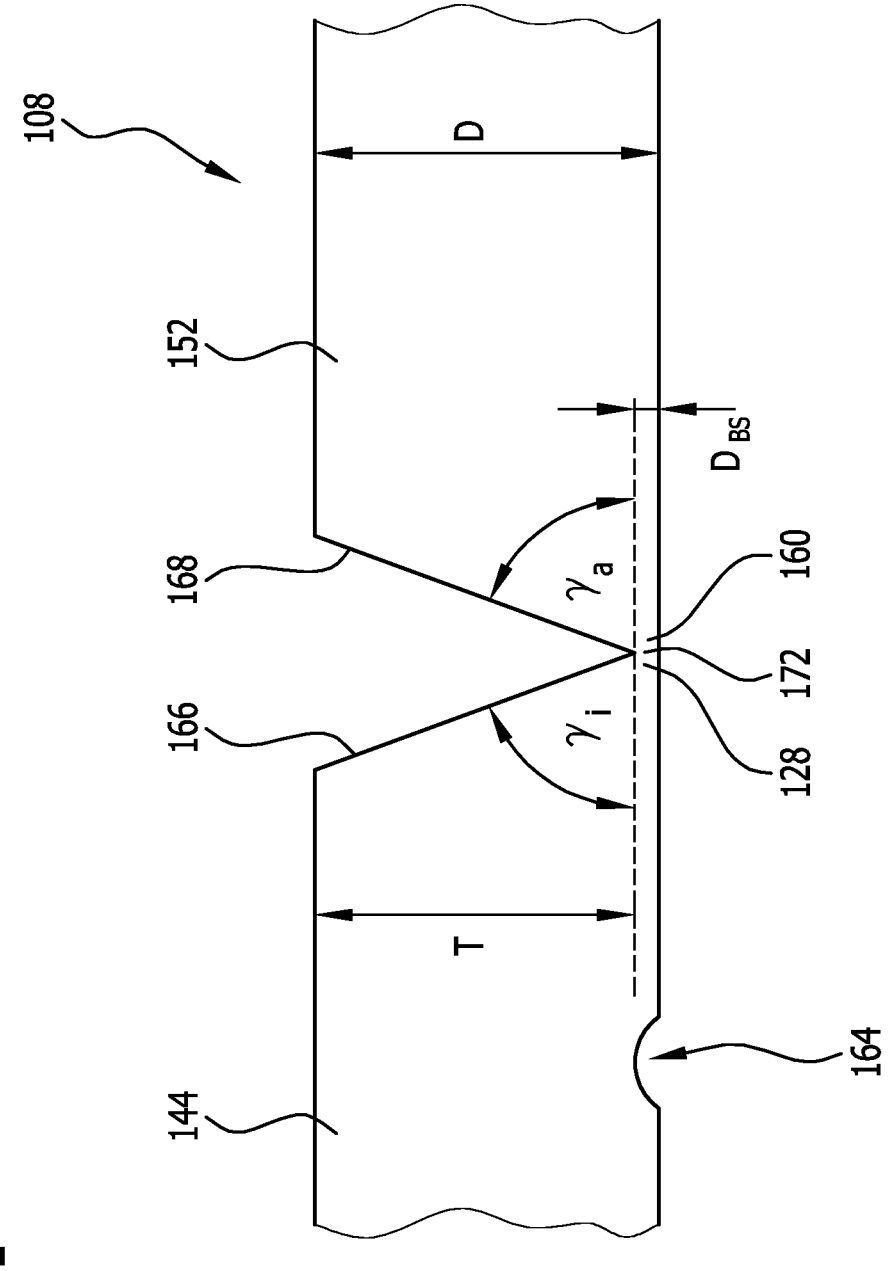
FIG. 11 is a section corresponding to FIG. 9 through a curved portion of the rupture device from FIG. 9.

An alternative embodiment of a rupture device 108 shown in FIGS. 9 through 11 differs from the other embodiments shown in particular in that an only one-sided (main) embossing is provided for producing the rupture web 128.

As an alternative to this, it can also be provided that an embossing on both sides serve to produce the rupture web 128, wherein the indentation depths T on the two sides are different. In particular, it can be provided that an indentation depth T for producing the rupture web 128 be, at least in portions or completely circumferentially on one side, at least approximately twice, and preferably at least approximately five times—for example, at least approximately ten times—an indentation depth T on the further side.

Furthermore, alternatively or additionally to an embossing on one side or on both sides, and in particular in addition to an embossing on one side or on both sides for the production of the rupture web, a deformation or shaping for producing a knife-edged ring 164 can be provided. In particular, this enables optimized positioning and/or guidance during the production of the rupture element 128.

It may be favorable if the first depression 136, and in particular the single depression 136, comprises a flank region 154 forming an inner flank 166, and a flank region 154 forming an outer flank 168.

The inner flank 166 is arranged facing the rupture surface 144. The outer flank is arranged on the side, facing away from the rupture surface 144, of the rupture web 128.

It can be advantageous if the inner flank 166 and/or the outer flank 168 form varying angles with a main surface and/or central plane of the rupture element 108 at different points along the rupture web 128.

For example, it can be provided that, in a breaking portion 160 of the rupture web 128, and in particular in a backstretch portion 170 opposite a holding portion 158 and forming an in particular straight breaking portion 160, an angle $\alpha_a$ (alpha a) between the outer flank 168 and the main surface and/or central plane of the rupture element 108 be at least approximately 60°, preferably at least approximately 80°, and in particular at least approximately 85°, and/or at most approximately 90°, and preferably at most approximately 89°. For example, the angle is approximately 88°.

Furthermore, it can be provided that, in the breaking portion 160 of the rupture web 128, and in particular in the backstretch portion 170 opposite the holding portion 158 and forming an in particular straight breaking portion 160, an angle $\alpha_i$ (alpha i) between the inner flank 166 and the main surface and/or central plane of the rupture element 108 be at least approximately 35°, preferably at least approximately 40°, and in particular at least approximately 50°, and/or at most approximately 75°, and preferably at most approximately 65°. For example, the angle is approximately 60°.

For example, it can be provided that, in a holding portion 158 of the rupture web 128, an angle $\beta_a$ (beta a) between the outer flank 168 and the main surface and/or central plane of the rupture element 108 be at least approximately 60°, preferably at least approximately 80°, and in particular at least approximately 85°, and/or at most approximately 90°, and preferably at most approximately 89°. For example, the angle is approximately 88°.

Furthermore, it can be provided that, in the holding portion 158 of the rupture web 128, an angle $\beta_i$ (beta i) between the inner flank 166 and the main surface and/or central plane of the rupture element 108 be at least approximately 35°, preferably at least approximately 40°, and in particular at least approximately 50°, and/or at most approximately 75°, and preferably at most approximately 65°. For example, the angle is approximately 60°.

For example, it can be provided that, in one or in two curved portions 172 of the rupture web 128, which form a breaking portion 160 and in particular each connect a holding portion 158 to a backstretch portion 170, an angle $\gamma_a$ (gamma a) between the outer flank 168 and the main surface and/or central plane of the rupture element 108 be at least approximately 30°, preferably at least approximately 40°, and in particular at least approximately 50°, and/or at most approximately 80°, and preferably at most approximately 70°. For example, the angle is approximately 60°.

Furthermore, it can be provided that, in one or in two curved portions 172 of the rupture web 128, which form a breaking portion 160 and in particular each connect a holding portion 158 to a backstretch portion 170, an angle $\gamma_i$ (gamma i) between the inner flank 166 and the main surface and/or central plane of the rupture element 108 be at least approximately 30°, preferably at least approximately 40°, and in particular at least approximately 50°, and/or at most approximately 80°, and preferably at most approximately 70°. For example, the angle is approximately 60°.

The angle $\alpha_i$ (alpha i) is preferably smaller than the angle $\alpha_a$ (alpha a). Alternatively or additionally, it can be provided that the angle $\beta_i$ (beta i) be smaller than the angle $\beta_a$ (beta a).

The angle $\gamma_i$ (gamma i) is preferably at least approximately equal to the angle $\gamma_a$ (gamma a).

By means of the described angle selection, in particular an optimized and reliable opening of the rupture element 108 can be made possible, wherein, further, a complete detachment of the rupture surface 144 from the surrounding region 152 can preferably be prevented. Furthermore, a desired opening angle of the rupture surface 144 can preferably be set, wherein the opening angle indicates the angle by which the rupture surface 144 rotates around the holding portion 158 until it comes into an open position.

As can further be seen in FIGS. 9 through 11, it can be provided that the thickness $D_{BS}$ of the rupture web 128 in the breaking portions 160 be less than the thickness D in the holding portion 158.

In addition, the rupture web 128 in the holding portion 158 is preferably designed to be wider, which is attainable in particular in that an embossing tool for producing the rupture element 108 has flanks largely similar in shape to those in the backstretch portion 170, but, at its end defining the rupture web 128, is flattened and/or shortened.

Optionally, a counter-embossing with a small indentation depth T can be provided for the single-sided embossing shown in FIGS. 9 through 11.

In principle, the foregoing information is suitable for optimizing each depression 136 and/or 138.

The following are particular embodiments:

1. Rupture device (108) comprising a wall component (126) which has at least one rupture web (128), wherein the at least one rupture web (128) has a thickness varying in the longitudinal direction (130), and/or wherein the at least one rupture web (128) is formed by at least one first depression (136), which is arranged on a first side (140) of the wall component (126), and at least one second depression (138), which is arranged on a second side (142), facing away from the first side (140), of the wall component (126).

2. Rupture device (108) according to embodiment 1, characterized in that the at least one first depression (136) and/or the at least one second depression (138) are formed by stamping.

3. Rupture device (108) according to embodiment 1 or 2, characterized in that a part of the at least one rupture web (128) or the entire at least one rupture web (128) forms a predetermined breaking point (134).

4. Rupture device (108) according to one of embodiments 1 through 3, characterized in that, in a cross-section that is taken parallel to a main extension plane of the wall component (126), the at least one rupture web (128) has a closed shape the extension of which is greater in one spatial direction, e.g., by a factor of 2 or more, than in a spatial direction extending perpendicular thereto.

5. Rupture device (108) according to one of embodiments 1 through 4, characterized in that the at least one first depression (136) and/or the at least one second depression (138) are, in a cross-section taken perpendicular to a main extension plane of the wall component (126), at least approximately triangular, in the shape of an isosceles trapezoid, or arcuate.

6. Rupture device (108) according to one of embodiments 1 through 5, characterized in that a ratio of a thickness of the wall component (126) in a region (152) surrounding the at least one rupture web (128) to a thickness of the at least one rupture web (128) is at least about 2:1 and/or at most about 30:1.

7. Rupture device (108) according to one of embodiments 1 through 6, characterized in that the at least one rupture web (128) is arranged and/or designed in such a way that it breaks and/or tears partially or completely when a critical pressure and/or a critical temperature is exceeded.

8. Rupture device (108) according to one of embodiments 1 through 7, characterized in that the at least one rupture web (128) has an—in particular, annular—closed shape, which surrounds a rupture surface (144), wherein, in particular, the rupture surface (144) has a thickness which corresponds at least approximately to a thickness of a region (152), surrounding the at least one rupture web (128), of the wall component (126).

9. Rupture device (108) according to one of embodiments 1 through 8, characterized in that the at least one rupture web (128) has at least one breaking portion (160) and at least one holding portion (158), wherein a minimum material thickness of the at least one rupture web (128) in the at least one breaking portion (160) is less than a minimum material thickness of the at least one rupture web (128) in the at least one holding portion (158) by at least about 10%, and in particular by at least about 30%.

10. Rupture device (108) according to one of embodiments 1 through 9, characterized in that a ratio of a thickness of the wall component (126) to a width of the at least one rupture web (128) is at least about 5:1, and in particular at least about 10:1.

11. Rupture device (108) according to one of embodiments 1 through 10, characterized in that a ratio of a volume formed by the at least one first depression (136) and/or the at least one second depression (138) to a volume of a processed region of the wall component (126) in which the at least one first depression (136) and/or the at least one second depression (138) are arranged is at least about 1:2 and/or at most about 4:1.

12. Rupture device (108) according to one of embodiments 1 through 11, characterized in that the rupture device (108) comprises several rupture web parts (146), wherein a rupture web part forms a rupture web edge (146), and in particular a closed edge, and wherein one or more further rupture web parts form separating rupture webs (148), which divide a rupture surface (144) surrounded by the rupture web edge (146) into several rupture surface parts (150).

13. Rupture device (108) according to one of embodiments 1 through 12, characterized in that the at least one rupture web (128) lies at least approximately within a central plane of the wall component (126).

14. Rupture device (108) according to one of embodiments 1 through 12, characterized in that an indentation depth in the region of the at least one first depression (136) is at least about 45% smaller, and in particular at least about 40% smaller, than an indentation depth in the region of the at least one second depression (138).

15. Electrochemical cell (110) comprising:
a housing (114) surrounding an interior space (118) of the electrochemical cell (110); and
a rupture device (108) which is arranged on a wall (122) of the housing (114) and is in particular integrally formed with the wall (122),
wherein the rupture device (108) comprises at least one rupture web (128), wherein the at least one rupture web (128) has a thickness varying in the longitudinal direction (130), and/or wherein the at least one rupture web (128) is formed by at least one first depression (136), which is arranged on an inner side, facing the interior (118), of the wall (122), and at least one second depression (138), which is arranged on an outer side, facing away from the interior space (118), of the wall (122).

16. Electrochemical cell (110) according to embodiment 15, characterized in that the at least one rupture web (128) is formed by stamping, and in particular by stamping a non-preprocessed region of the wall (122).

17. Electrochemical cell (110) according to embodiment 15 or 16, characterized in that the at least one rupture web (128), which has a thickness varying in the longitudinal direction (130), is formed by a depression (136) which is arranged on the inner side, facing the interior (118), of the wall (122), and in particular is embossed therein.

18. Electrochemical cell (110) according to one of embodiments 15 through 17, characterized in that the at least one rupture web (128) has at least one breaking portion (160) which breaks and/or tears when a critical pressure and/or a critical temperature in the interior (118) of the electrochemical cell (110) is exceeded, and in that the at least one rupture web (128) has at least one holding portion (158) which, when a critical pressure and/or a critical temperature in the interior (118) of the electrochemical cell (110) is exceeded, maintains a connection between a rupture surface (144), surrounded by the at least one rupture web (128), and a region (152), which surrounds the at least one rupture web, of the wall (122) and about which the rupture surface (144) is moved, and in particular pivoted.

19. Electrochemical cell (110) according to embodiment 18, characterized in that a minimum material thickness of the at least one rupture web (128) in the at least one breaking portion (160) is at least about 10%, and in particular at least about 30%, less than a minimum material thickness of the at least one rupture web (128) in the at least one holding portion (158).

20. Electrochemical cell (110) according to one of embodiments 15 through 19, characterized in that a rupture surface (144) surrounded by at least one breaking portion (160) in an open state of the rupture device (108) forms a flow guide element (162) for fluid flowing out of the interior (118) of the electrochemical cell (110), wherein the rupture surface (144) preferably forms an opening angle of at least about 100 and/or at most about 80° with a main extension plane of the wall (122).

21. Electrochemical cell (110) according to one of embodiments 15 through 20, characterized in that the at least one rupture web (128) has an—in particular, annular—closed shape, and is formed, for example, in an at least approximately oval or at least approximately rectangular shape in a cross-section taken parallel to a main extension plane of the wall (122).

22. Electrochemical cell (110) according to one of embodiments 15 through 21, characterized in that a ratio of a length of at least one breaking portion (160) of the at least one rupture web (128) to a length of at least one holding portion (158) of the at least one rupture web (128) is at least 2:1 and/or at most 20:1.

23. Electrochemical cell (110) according to one of embodiments 15 through 22, characterized in that at least one breaking portion (160) of the at least one rupture web (128) is at least approximately U-shaped in a cross-section taken parallel to a main extension plane of the wall (122), and in that at least one holding portion (158) of the at least one rupture web (128) connects legs of the U-shape to a closed shape—for example, to a closed oval.

24. Electrochemical cell (110) according to one of embodiments 15 through 23, characterized in that the at least one first depression (136) and/or the at least one second depression (138) are, in a cross-section taken perpendicular to a main extension plane of the wall (122), at least approximately triangular, in the shape of an isosceles trapezoid, or arcuate.

25. Electrochemical system (100) comprising one or more electrochemical cells (110) according to one of embodiments 15 through 24, and/or comprising:
a housing (102) surrounding an interior (104) of the electrochemical system (100); and
a rupture device (108) which is arranged on a wall (106) of the housing (102) and is in particular integrally formed with the wall (106),
wherein the rupture device (108) comprises at least one rupture web (128), wherein the at least one rupture web (128) has a thickness varying in the longitudinal direction (130), and/or wherein the at least one rupture web (128) is formed by at least one first depression (136), which is arranged on an inner side, facing the interior (104), of the wall (106) of the electrochemical system (100), and at least one second depression (138), which is arranged on an outer side, facing away from the interior (104), of the wall (106) of the electrochemical system (100).

26. Method for producing a rupture device (108), and in particular a rupture device (108) according to one of embodiments 1 through 14, wherein the method comprises the following steps:

providing a wall component (126);

introducing at least one rupture web (128) into the wall component (126), wherein the at least one rupture web (128) has a thickness varying in the longitudinal direction (130); and/or introducing at least one first depression (136) on a first side (140) of the wall component (126) and—in particular, simultaneously—introducing at least one second depression (138) on a second side (142) facing away from the first side (140) of the wall component (126), whereby the at least one rupture web (128) is formed.

27. Method for producing an electrochemical cell (110), and in particular for producing an electrochemical cell (110) according to one of embodiments 15 through 24, wherein the method comprises the following steps:

providing a wall (122) of a housing (114) of an electrochemical cell (110), and in particular a cover element (120);

introducing at least one rupture web (128) into the wall (122), wherein the at least one rupture web (128) has a thickness varying in the longitudinal direction (130); and/or introducing at least one first depression (136) on a first side (140) of the wall (122) and—in particular, simultaneously—introducing at least one second depression (138) on a second side (142) facing away from the first side (140) of the wall (122), whereby the at least one rupture web (128) is formed;

connecting the wall (122) to one or more further housing components (112), so that an interior space (118) of the electrochemical cell (110) is surrounded by the housing (114).

28. Method according to embodiment 27, characterized in that the at least one rupture web (128) is embossed into the wall (122) of the electrochemical cell (110).

29. Method for producing an electrochemical system (100), and in particular for producing an electrochemical system (100) according to embodiment 25, wherein the method comprises the following steps:

providing a wall (106) of a housing (102) of an electrochemical system (100);

introducing at least one rupture web (128) into the wall (106), wherein the at least one rupture web (128) has a thickness varying in the longitudinal direction (130); and/or introducing at least one first depression (136) on a first side (140) of the wall (106) and—in particular, simultaneously—introducing at least one second depression (138) on a second side (142) facing away from the first side (140) of the wall (106), whereby the at least one rupture web (128) is formed;

connecting the wall (106) to one or more further housing components, so that an interior space (104) of the electrochemical system (100) is surrounded by the housing (102).

30. Method according to embodiment 29, characterized in that the at least one rupture web (128) is embossed into the wall (106) of the electrochemical system (100).

The invention claimed is:

1. A rupture device comprising a wall component which has a rupture surface and at least one rupture web which surrounds the rupture surface along a longitudinal direction of the at least one rupture web, wherein the at least one rupture web has a thickness varying in the longitudinal direction along at least part of the rupture web, and wherein the at least one rupture web is formed by at least one first depression, which is arranged on a first side of the wall component, and at least one second depression, which is arranged on a second side, facing away from the first side, of the wall component, wherein the at least one first depression and/or the at least one second depression are formed by stamping.

2. The rupture device according to claim 1, wherein the at least one first depression and the at least one second depression are formed by said stamping.

3. The rupture device according to claim 1, wherein a part of the at least one rupture web or the entire at least one rupture web forms a predetermined breaking point.

4. The rupture device according to claim 1, wherein in a cross-section that is taken parallel to a main extension plane of the wall component, the at least one rupture web has a closed shape an extension of which is greater in one spatial direction or by a factor of 2 or more, than in a spatial direction extending perpendicular thereto.

5. The rupture device according to claim 1, wherein the at least one first depression and/or the at least one second depression are, in a cross-section taken perpendicular to a main extension plane of the wall component, at least approximately triangular, in the shape of an isosceles trapezoid, or arcuate.

6. The rupture device according to claim 1, wherein a ratio of a thickness of the wall component in a region surrounding the at least one rupture web to a thickness of the at least one rupture web is at least about 2:1 and/or at most about 30:1.

7. The rupture device according to claim 1, wherein the at least one rupture web is arranged and/or designed in such a way that it breaks and/or tears partially or completely when a critical pressure and/or a critical temperature is exceeded.

8. The rupture device according to claim 1, wherein the at least one rupture web has a closed shape which surrounds the rupture surface, or the rupture surface has a thickness which corresponds at least approximately to a thickness of a region, surrounding the at least one rupture web, of the wall component.

9. The rupture device according to claim 1, wherein the at least one rupture web has at least one breaking portion and at least one holding portion, wherein a minimum material thickness of the at least one rupture web in the at least one breaking portion is less than a minimum material thickness of the at least one rupture web in the at least one holding portion by at least about 10%, or by at least about 30%.

10. The rupture device according to claim 1, wherein a ratio of a thickness of the wall component to a width of the at least one rupture web is at least about 5:1.

11. The rupture device according to claim 1, wherein a ratio of a volume formed by the at least one first depression and/or the at least one second depression to a volume of a processed region of the wall component in which the at least one first depression and/or the at least one second depression are arranged is at least about 1:2 and/or at most about 4:1.

12. The rupture device according to claim 1, wherein the rupture device comprises several rupture web parts, wherein a rupture web part forms a rupture web edge or a closed edge, and wherein one or more further rupture web parts form separating rupture webs, which divide the rupture surface surrounded by the rupture web edge into several rupture surface parts.

13. The rupture device according to claim 1, wherein the at least one rupture web lies at least approximately within a central plane of the wall component.

14. The rupture device according to claim 1, wherein an indentation depth in a region of the at least one first depression is at least about 45% smaller than an indentation depth in the region of the at least one second depression.

15. A method for producing a rupture device, and in particular said rupture device according to claim 1, wherein the method comprises the following steps:

providing a wall component;

introducing at least one rupture web into the wall component, wherein the at least one rupture web has a thickness varying in the longitudinal direction; and introducing at least one first depression on a first side of the wall component and introducing at least one second depression on a second side facing away from the first side of the wall component, whereby the at least one rupture web is formed, wherein the at least one first depression and the at least one second depression are embossed into the wall component, or an embossing for producing a depression and/or a rupture web is provided only on one of both sides of the wall component, wherein an embossing tool for producing the rupture element has flattened ends and the thickness varying in the longitudinal direction is formed by the flattened ends.

16. The method according to claim 15, wherein there is a gradual change in thickness of the embossing tool in the longitudinal direction at the flattened ends.

17. The rupture device according to claim 1, wherein the varying thickness of the at least one rupture web is due to a gradual change in thickness in the longitudinal direction.

18. The rupture device according to claim 17, wherein the gradual change in thickness in the longitudinal direction is stepped or continuous.

19. A rupture device comprising a wall component which has at least one rupture web, wherein the at least one rupture web has a thickness varying in a longitudinal direction, and wherein the at least one rupture web is formed by at least one first depression, which is arranged on a first side of the wall component, and at least one second depression, which is arranged on a second side, facing away from the first side, of the wall component, wherein the at least one first depression and the at least one second depression are formed by stamping, wherein an indentation depth in a region of the at least one first depression is at least about 40% smaller than an indentation depth in the region of the at least one second depression.

20. The rupture device according to claim 19, wherein the indentation depth in the region of the at least one first depression is at least about 45% smaller than the indentation depth in the region of the at least one second depression.

* * * * *